United States Patent [19]

Stanley et al.

[11] Patent Number: 5,127,873
[45] Date of Patent: Jul. 7, 1992

[54] FOOD EMULSION CASING PACKAGING SYSTEM

[75] Inventors: Thomas R. Stanley, Kansas City; Mark L. Fox, Pleasant Valley, both of Mo.

[73] Assignee: Teepak, Inc., Westchester, Ill.

[21] Appl. No.: 573,953

[22] Filed: Aug. 28, 1990

[51] Int. Cl.⁵ .................... B65B 5/10; G01N 31/00
[52] U.S. Cl. .................... 452/198; 53/563; 221/50
[58] Field of Search ............ 452/30, 35, 198; 206/403, 459; 53/429, 563, 567; 221/50

[56] References Cited

U.S. PATENT DOCUMENTS

| | | | |
|---|---|---|---|
| 1,797,137 | 3/1931 | Gochnauer | 452/35 |
| 2,239,222 | 4/1941 | Funke | 202/52 |
| 2,269,039 | 1/1942 | Ross | 206/57 |
| 2,423,861 | 7/1947 | Vogt | 452/35 |
| 2,575,467 | 11/1951 | Reichel et al. | 452/35 |
| 2,936,937 | 5/1960 | Guyer | 225/48 |
| 3,148,992 | 9/1964 | Hewitt | 99/176 |
| 4,201,029 | 5/1980 | Lerner et al. | 53/429 |
| 4,328,184 | 5/1982 | Kondo | 422/58 |
| 4,944,069 | 7/1990 | Townsend et al. | 452/35 |

FOREIGN PATENT DOCUMENTS 3318373 11/1984 Fed. Rep. of Germany .

Primary Examiner—Willis Little
Attorney, Agent, or Firm—Michael L. Dunn

[57] ABSTRACT

Disclosed is a food emulsion casing packaging system which incorporates means for readily and rapidly removing non-shirred, flat casing from its shipping carton, means or facilely and rapidly threading that casing into automated food emulsion stuffing equipment, and means for rapidly and readily forming the casing into a tubular form at the point of introduction of the food emulsion to the casing.

16 Claims, 6 Drawing Sheets

FOOD EMULSION CASING PACKAGING SYSTEM

BACKGROUND OF THE INVENTION

1. Field of the Invention

The present invention relates generally to the packaging of film or sheet type materials which themselves are used to package goods. More particularly, the present invention relates to the packaging of tubular casings for food products, specifically flattened, non-shirred casings for the continuous packaging of emulsions such as, for example, processed cheeses and luncheon meats.

2. Background of the Technology

In the packaging of food emulsions, in particular meat emulsions, into sausage-like packages, it is desired by the industry to use continuous tubular casings in order to minimize the interruptions, i.e. downtime, to what can generally be classified as "automated food stuffing equipment." Generally, continuous flattened tubular casings are available packaged on, for example, a roll, a coil, a wheel or a spool, or, alternatively, packaged in an accordion-folded or pleated manner. A roll or spool, as well as a coil or wheel, of course, normally, although not always, needs to be mounted for rotation as the casing is fed into the automated stuffing machines. The accordion-folded pleated material, on the other hand, does not need to be removed from its package for use, but is simply fed from the opened shipping carton directly into the automated stuffing machinery.

Where non-shirred, flattened casing is to be used, one approach to increasing the amount of running time, between start-up of the automated packing equipment and shut-down to load in new casing material, is to increase the size of the roll, coil, spool or wheel (hereinafter collectively referred to as "rolls") on which the flattened casing is wound. This has limitations, in that the larger the size of the roll, the heavier it becomes and the more cumbersome it becomes to handle. As a consequence, heavier-duty feed equipment is required to mount such rolls, and relatively higher-powered drive equipment is required to overcome the greater static inertia of such packaging to feed out the casing material wound thereon. In addition, the mounting of enlarged rolls becomes more difficult, as such increased weight packaging is considerably less easily handled. Thus, the weight of the packages of flattened casing becomes a significant factor in relation to the facility of their use.

Another approach that has been proposed is related to the packaging of the flattened coils in the accordion-folded, pleated style (hereinafter referred to as "folded" or "folding") in boxes. Firstly, folding of the flattened casing enables complete filling of squared boxes. This is an improvement in terms of space economy in comparison to the packaging of cylindrically shaped rolls in squared boxes. However, weight of the package is still a factor. A variety of approaches have been proposed whereby the tail end of folded flattened casing in a given box (the last portion of the flattened casing remaining in the box as it is emptied) can be attached to the lead end of a casing extracted from a new and succeeding box. The most simple approach is to splice the two ends together, on-the-fly, with some form of adhesive, for example, tape. However, with the high-speed machinery that is used at present for automated packing, splicing on-the-fly requires a heightened degree of manual dexterity and not all are capable of doing it routinely on an error-free basis, very rapidly as is required.

Another approach is described in West German Laid Open Patent Application (Offenlegungsschrift) 33 18 373.2. In this patent application, arrangements are described in which the tail end of the flattened casing is left to extend out of the packaging carton so that it may be spliced to the lead end of the next package of flattened casing. This splicing can be affecting while the automated stuffing equipment is in full operation, during the period in which the initial packaging carton is being emptied. Thus the degree of dexterity is not required to do it so quickly on-the-fly, as there is no need to do it instantaneously; rather it can be done as the material from the carton is feeding into the automated stuffing equipment.

There is a basic problem, however, inherent in any splicing technique. That is, the splice, if it holds, ultimately will encompass the food emulsion which is packed into it. The area of the splice, even though it may be functionally acceptable, still creates an unsightly joint on the food product which customers and users tend to find somewhat objectionable. Also, as suggested, frequently the splicing does not hold, causing even more downtime. Therefore, another approach is to enhance the ease of loading each package of flattened film casing, unspliced, into the automated equipment, and thus, enable that time to be shortened. This approach does include the downtime for changing the casing at the end of each packaging carton. However, on the other hand, it does eliminate the objectionable splice and the specter of inordinate downtime due to failed splices.

To load the casing into an automated stuffing machine, firstly the flattened casing must be threaded through a system of guides which may include rollers. This guide/roller system feeds the casing through the machine to the actual point where the food emulsion is to be stuffed into it. At about the point where the actual food stuffing occurs, the flattened tubular casing must be opened up to form a tube, for example a cylindrical shape, which can be subsequently stuffed with food emulsion. Many of the casing materials, especially the synthetic plastic materials, tend to be relatively difficult to open up and form into a tubular shape. In addition, due to the fact that the casing materials are quite flexible, they tend to be somewhat difficult to thread into and through the guide/roller system of the automated food stuffing equipment.

The focus of the present invention is on enhancing the threadability of the flattened casing through the guide/roller system and also on enhancing the opening up and formation of a tubular shape from that flattened casing subsequent to threading. The present invention also focuses on facilitating rapid extraction of the lead end of flattened casing from new shipping cartons of that casing. One aspect of the present invention incorporates both means for threading and means for subsequently opening up and forming a tubular shape, all in regard to flattened casing. Further, the present invention includes means for rapidly and easily opening new cartons of flattened casing and extracting the lead end of the flattened casing from that carton.

SUMMARY OF THE INVENTION

The present invention comprises a food emulsion casing packaging system which comprises means for extracting food emulsion casing, packaged in a flattened, non-shirred form, from a container without substantially opening that container.

The system also comprises deformable leader means, separate from but attached to the lead end of the food emulsion casing, in the form of an extension of the food casing and adapted to be detachably mounted to the exterior of the packaging container such that detachment of the leader means enables extraction of the food emulsion casing from the container without the container being substantially opened.

The system, in addition, comprises a pair of lead tip extensions, fixed to that end of the leader means which is opposite the attachment of that leader means attached to the lead end of the food emulsion casing. The lead tip extensions are adapted to be inserted into and through guide/roller means of automated food emulsion packing equipment, and the lead tip extensions are also adapted to facilitate deformation of the leader means from a flattened shape to a tubular shape. Also, the lead tip extensions which are also adapted to facilitate alignment of the food emulsion casing with that means of the automated food emulsion packing equipment, e.g., the stuffing horn, which fills the food emulsion casing with food emulsion.

More specifically, preferably a lead end piece is attached to the lead end of the flattened casing. The lead end piece is, likewise, in flattened form and is generally equivalent in width to the flattened casing, but preferably with sufficient clearance that it can be slipped inside of that lead end of the flattened casing for a snug fit therewith. The lead end piece, like the flattened casing, is tubular in final form, and like the flattened casing, is initially flattened. Preferably, each of the flattened faces of the lead end piece includes a lead point located at that end of the lead piece which is opposite the end which is mounted to the lead end of the flattened casing. The lead points are formed as though each flat face of the lead end piece were diagonally cut to form unequal length parallel longitudinal edges, one being longer than the other. The lead points, however, are arranged such that they are transversally opposite each other on the respective flat surfaces of the flattened lead end piece.

The flattened casing is packed into shipping cartons in the conventional manner. The packing may be either the folded style or the rolled style, both styles which have been previously described.

At that point on the shipping carton, which is adjacent to the as-packaged position of the lead end of the flattened casing, preferably a transverse slot is inserted, in one of the faces of the box, through which a short section of the lead end of the flattened casing is threaded. Then preferably the flattened lead end piece is inserted and snugly fitted into this short section of the lead end of the flattened casing which is protruding through the slot in the box. An adhesive is preferably used to mount the lead end piece to the lead end of the flattened casing. The adhesive preferably is a non-hardening, contact-type adhesive which is relatively easy to peel apart. The lead end piece mounted to the lead end of the flattened casing is then preferably folded along the side of the box and secured thereto by attachment means, for example, by some form of adhesive tape or, alternatively, a cap piece fitted over that end of the shipping carton. To use the flattened casing, the preferred attachment means is pulled off and the preferred lead end piece is readily threaded through the guide/roller means; the preferred two opposed lead points can be squeezed between the thumb and index finger and caused readily to form into a tubular section which then can be slipped over, for example, the stuffing horn of a meat emulsion pump, or alternatively otherwise fitted to the automated food stuffing equipment as desired.

DETAILED DESCRIPTION

Figure 1:
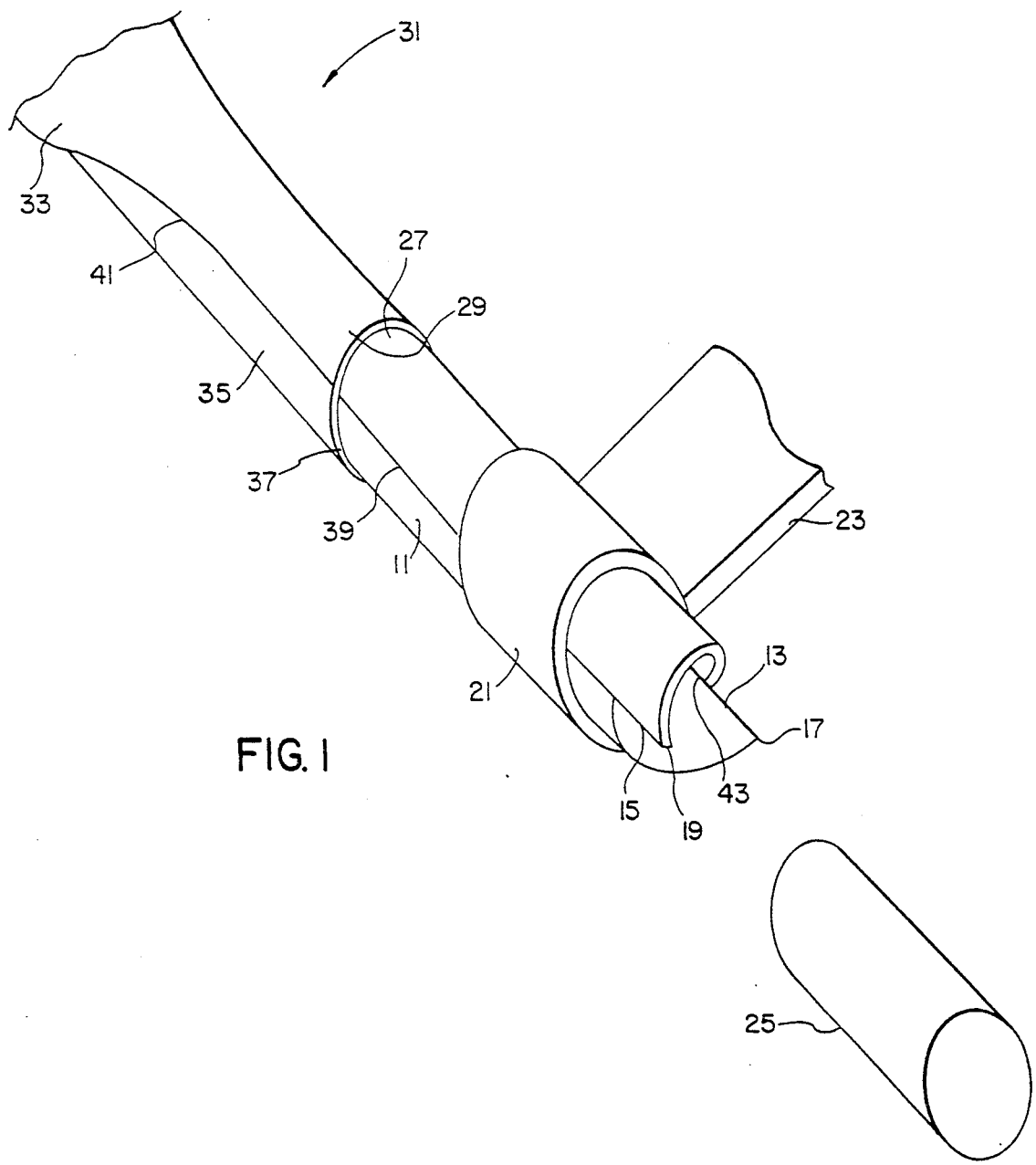
FIG. 1 is a semi-schematic projection view of the preferred lead end piece of the present invention which has been compressively formed into a cylindrical shape and extended through holder means associated with automated stuffing equipment to be advanced to the point at which food emulsion is introduced into the casing.

Referring to FIG. 1, lead end piece 11 has been formed (really de-formed) from its initial flat mode to the tubular configuration, specifically a cylindrical shape, as illustrated. This is preferably accomplished by the exertion of opposed pressure on the opposed side edges 13 and 15 of the lead tips 17 and 19 respectively of lead end piece 11. For example, the opposed pressure may be applied by squeezing the lead tips 17 and 19 between the thumb and index finger.

As shown in FIG. 1, the cylindrical form of lead end piece 11 has been extended through a holder means which functions to maintain the cylindrical form of lead end piece 11. The holder means shown in FIG. 1 may be, for example, a collar 21 mounted to a bracket 23, which in turn is otherwise mounted or fixed to the automated stuffing equipment (not shown). Also as shown in FIG. 1, lead end piece 11 is disposed such that it is positioned to be introduced to that means of the automated stuffing machine which directly introduces the food emulsion into the casing. For example, in FIG. 1 a stuffing horn 25 is shown. It will be understood by those with skill in the art that the tubular configuration of the holder means, as well as that of the packaged stuffed food emulsion product, does not necessarily need to be cylindrical, but could, for example, be square in cross-section, a form which is well known, for example, in the packaging of a type of processed cheese product.

At the trailing end 27 of lead end piece 11 there is shown the leading end 29 of tubular casing 31. As represented in FIG. 1, tubular casing 31 is shown in transition from a flat section 33 to a tubular section 35, corresponding in size and configuration generally to the tubular form of lead end piece 11 as shown in FIG. 1. As shown in FIG. 1, lead end piece 11 is mounted to tubular casing 31 at joint 37 as will be further explained hereinafter. Juncture 39, resulting from the fabrication of lead end piece 11, is shown in FIG. 1 as will, also, be further explained hereinafter. Fold edge 41 of tubular casing 31 is shown in FIG. 1 in transition from an actual edge to merely a crease or line in a cylindrical tubular casing 31, as corresponding to the transition which occurs to transform flat section 33 into tubular section 35. As shown in FIG. 1, collar 21 may simply be a tubular section of metal (or other relatively rigid material) with an inside dimension sized generally to fit over the tubular cross-section formed from the edge compression of lead end piece 11. As will be well understood by those with skill in the art, the addition of scoring or impressions, for additional fold lines in lead end piece 11, could produce, for example, square or hexagonal cross-sectioned tubular configurations on the compression of the edges of lead end piece 11. Correspondingly, the internal configuration of collar 21 could be changed to correspond to the desired cross-sectional shape, for example, a square or hexagon, respectively.

Figure 2:
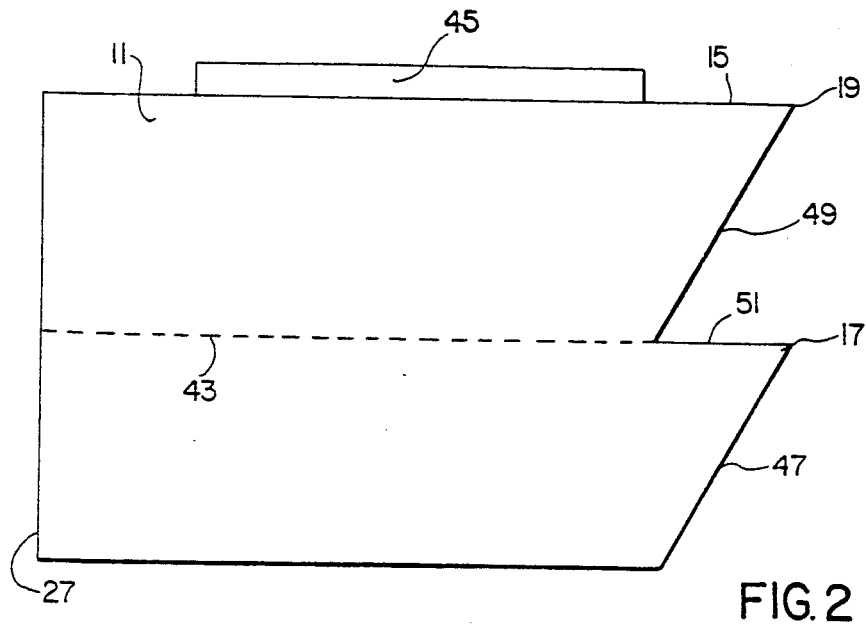
FIG. 2 is a representation of the preform from which the lead end piece of FIG. 1 is fabricated.

Referring to FIG. 2, lead end piece 11 is shown prior to its fabrication. The material used for lead end piece 11 may be anything which is more rigid, or stiffer, than tubular casing 31, and preferably it is waterproof. However, the material must be flexible and somewhat resilient to enable the formation of a tube, by deformation, as shown in FIG. 1 and as previously described. For example, lead end piece 11 may be fabricated from waterproof paper or a variety of different plastic materials.

Figure 3:
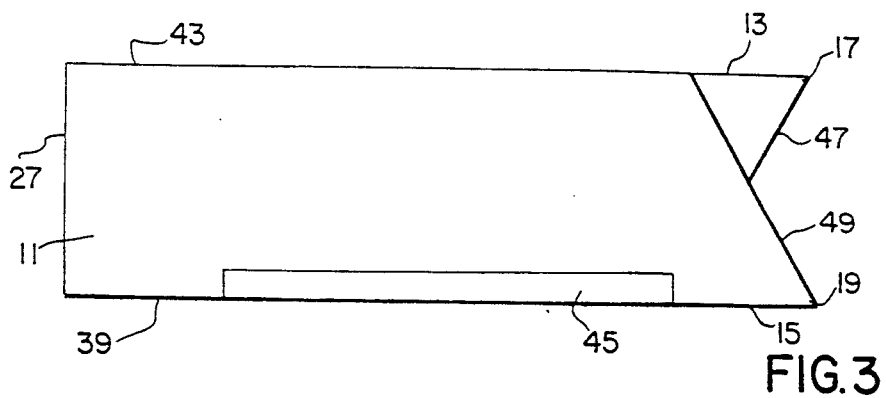
FIG. 3 is the lead end piece of FIG. 2 as fabricated.

Lead end piece 11 is made from a flat sheet of one of the appropriate materials. The flat sheet, as illustrated in FIG. 2, is sized to be generally about twice the width of the fabricated piece as shown in FIG. 3. As represented in FIG. 2, fabrication fold 43 is shown as a dotted line. In FIG. 3, on the other hand, it is shown as one of the edges of lead end piece 11. Fabrication fold 43 is the line along which the cut material, used to form lead end piece 11, is folded, thus, fabrication fold 43, after folding, becomes one of the edges of lead end piece 11 as shown in FIG. 3. The other edge, as indicated previously, is juncture 39 as is shown in FIG. 3. Juncture 39 is formed by folding the material shown in FIG. 2 along fabrication fold 43 to form fabricated lead end piece 11 as is shown in FIG. 3. Juncture 39 when formed comprises what were previously two opposed edges of the former flat sheet, the now-folded material. These two previously opposed edges are attached to each other, for example, by sealing or fixing. In other words, the two segments of the material, separated by fabrication fold 43, are attached together at juncture 39 as shown in FIG. 3. Adhesive means, such as pressure sensitive tape 45, may be used to effect this attachment, as will be well understood by those with skill in the art. Alternatively, an extension of the same piece that is used to form lead end piece 11, as is indicated by 46 in FIG. 2, could be used in place of pressure sensitive tape 45 such that when fabrication fold 43 is made, forming juncture 39, the extension piece could be folded over and attached to make the joint, for example, with glue, joining the two segments of juncture 39 together.

Again referring to FIG. 2, which is the sheet material from which lead end piece 11 is formed, it will be noted that lead tips 17 and 19 have been formed by two diagonal cuts 47 and 49 joined together by longitudinal cut 51. Longitudinal cut 51 forms side edge 13 as shown both in FIG. 3 and in FIG. 1. Side edge 15 extends from lead tip 1 in the direction of adhesive tape 45 with the length of side edge 15 being equivalent to that of longitudinal cut 51 (side edge 13). The trailing end 27 of lead end piece 11 is preferably square cut, as shown in both FIGS. 2 and 3.

Figure 2A:
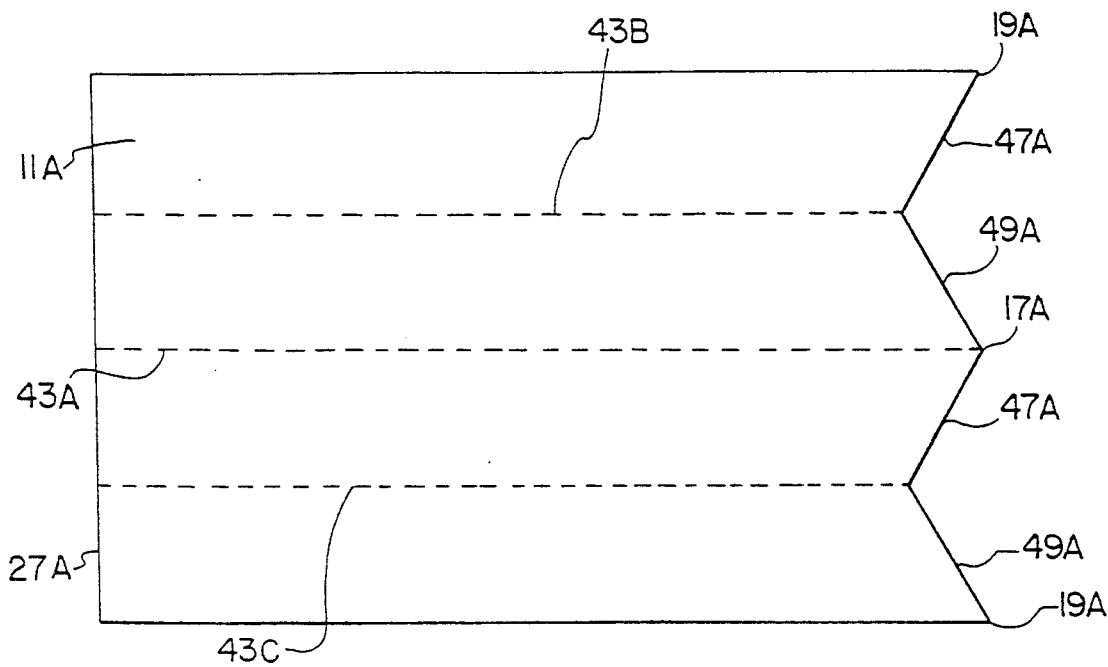
FIG. 2A is an alternative embodiment of the preform shown in FIG. 2.
Figure 3A:
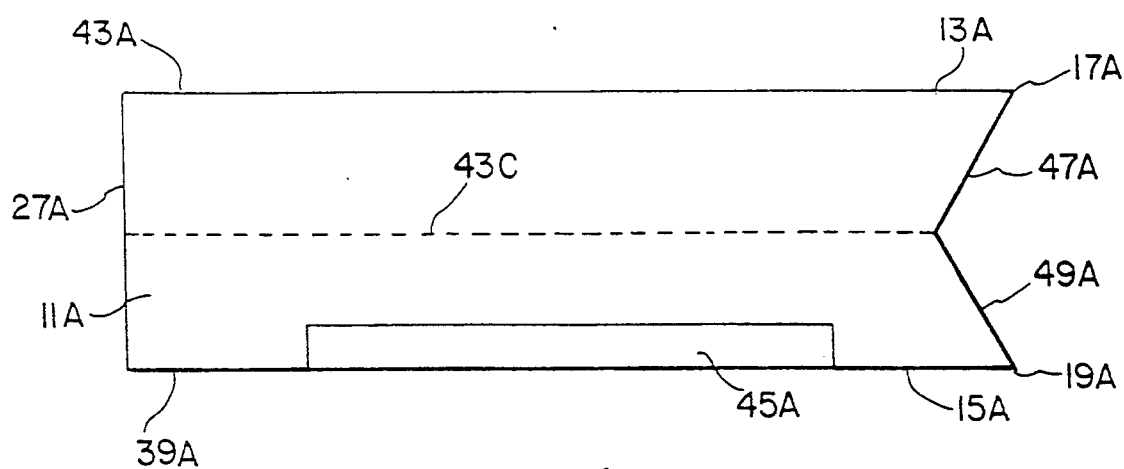
FIG. 3A is an alternative embodiment of the lead end piece shown in FIG. 3.

Referring to FIG. 2A, it will be noted that lead end piece 11A is identical to lead end piece 11, except in respect to the formation of lead tips 17A and 19A. Rather than diagonal cuts 47 and 49 being made, as shown in FIG. 2, half-diagonal cuts 47A and 49A are made, each of which extends one-half of the transverse distance across the opposed faces of the flattened tubular structure of lead end piece 11A, as shown in FIG. 3A. Thus, in respect to the alternative embodiment shown in FIGS. 2A and 3A, longitudinal cut 51 is eliminated and what were included as diagonal cuts 47 and 49 in FIGS. 2 and 3, are in FIGS. 2A and 3A, shortened to one-half their lengths, respectively, to form half-diagonal cuts 47A and 49A. The half-diagonal cuts 47A and 49A may be used with any cross-sectional arrangement of tubular form.

Also, in FIGS. 2A and 3A, it will be noted that optional fold lines 43B and 43C have been longitudinally scored into the faces of lead end piece 11A. These fold lines 43B and 43C could be utilized to form the previously exemplified square tubular cross-section in conjunction with the holder means having a square cross-section as previously described. As will be understood by those with skill in the art, additional score lines may be used in relation to the formation of other cross-sectional configurations.

Except as described above in regard to FIGS. 2A and 3A, fabrication of lead end piece IIA is, otherwise, identical to that described above in respect to lead end piece 11. The function and operation of lead end piece IIA in respect to tubular casing 31, carton 57, guides 53, rollers 55, stuffing horn 25 and food emulsion packaging equipment, automated or otherwise, is identical to that described herein in relation to lead end piece 11.

Figure 4:
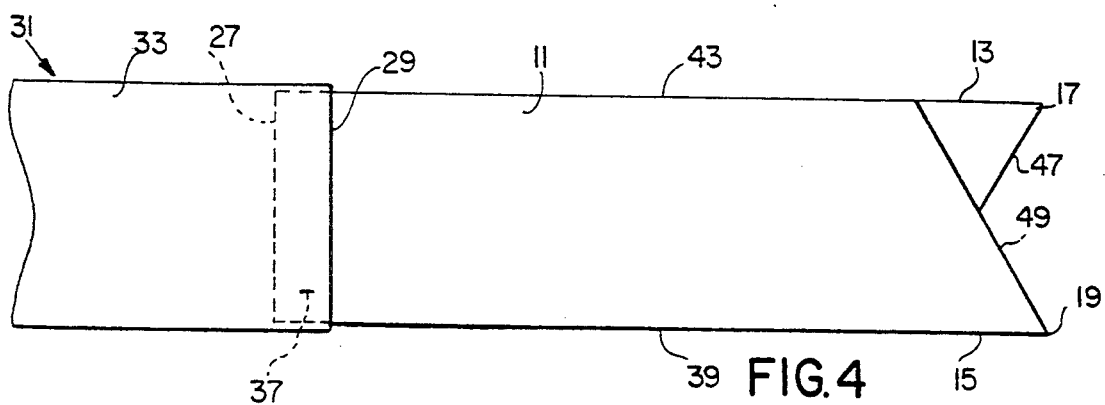
FIG. 4 is a plan view of the fabricated lead end piece of FIG. 3 as attached to and mounted to a flattened tubular casing.

Referring to FIG. 4, the fabricated lead end piece 11 of FIG. 3 is now inserted into the leading end 29 of tubular casing 31. Trailing end 27 is attached to the interior wall of tubular casing 31 which, at this point, forms a continuous flat section 33 adjacent to the leading end 29 of tubular casing 31. Preferably, the attachment means is a non-hardening adhesive material which enables leading end 29 to be readily stripped by hand from trailing end 27. Alternatively, for example, adhesive tape might be used or any other adaptable means of attachment, as will be well understood by those with skill in the art. The object is to enable the ready removal of lead end piece 11 in relation to the stuffing of tubular casing 31 with food emulsion.

Figure 5:
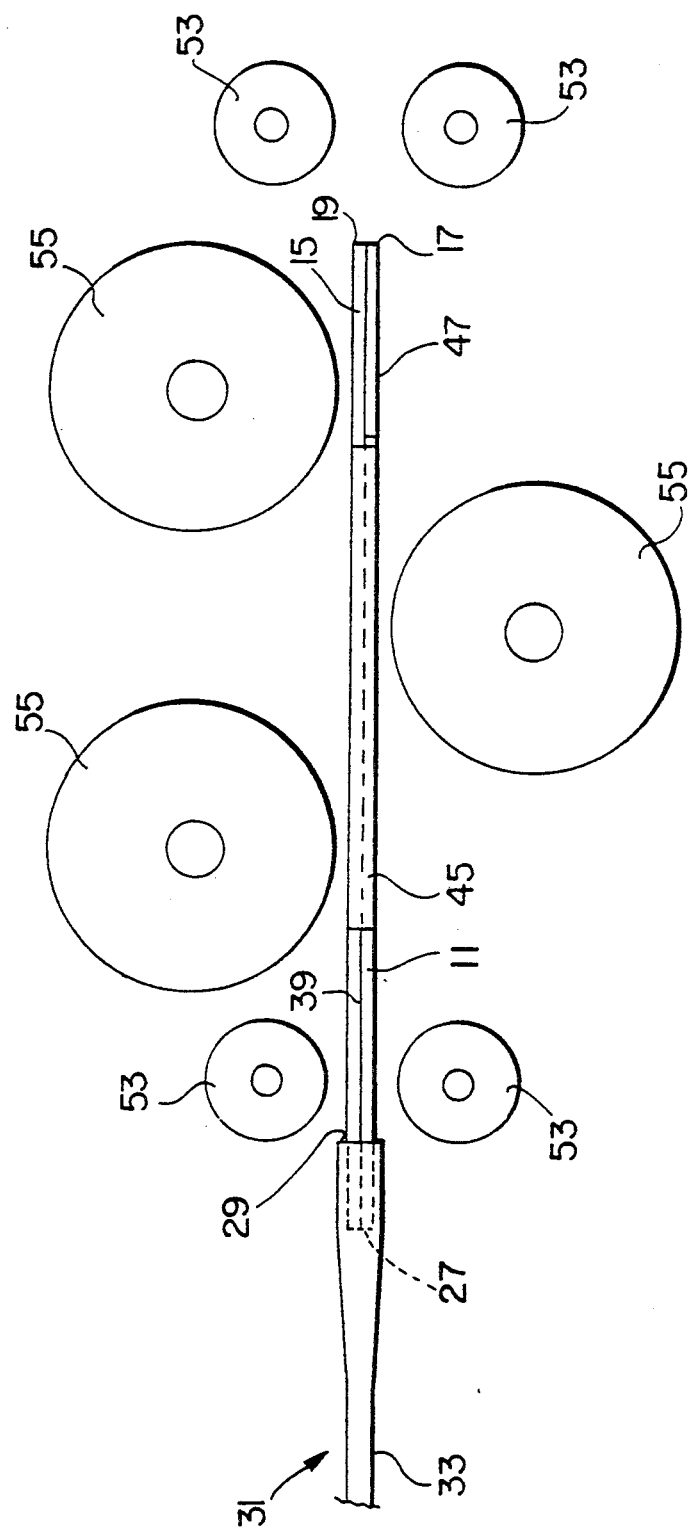
FIG. 5 is a schematic representation of the introduction of the lead end piece, with the flattened tubular casing mounted thereto, into the guide/roller system of automated stuffing equipment.

FIG. 4 is a plan view of the assembly of lead end piece 11 to tubular casing 31. The elevation of this same view is shown in FIG. 5 where lead end piece 11 is shown as being threaded through a schematically represented guide/roller system of automated food stuffing equipment. As shown in FIG. 5, the guide/roller system comprises guides 53 and rollers 55. As this guide/roller system forms no part of the present invention, its detail will not be described or further illustrated. However, it should be noted that most guide/roller systems used in automated food stuffing equipment not only include means for positioning and directing the movement of tubular casing 31, those means which are applied to the flat upper and lower portions thereof, as shown in FIG. 5, but also include means for laterally positioning tubular casing transversally to its longitudinal movement. These lateral guides prevent the flow of tubular casing 31 from wandering from one side to the other. Because of these lateral guide means the inclusion of two lead tips 17 and 19, positioned adjacent to side edges 13 and 15 respectively, provide a great advantage. As will be well understood by those with skill in the art from viewing FIG. 5, lead tips 17 and 19 provide very facile means for introduction of lead end piece 11 and, consequently, tubular casing 31, between guides 53 and rollers 55. Because of the location of lead tips 17 and 19 adjacent to side edges 13 and 15, respectively, they also provide great facility in introducing and laterally aligning lead end piece 11 and, consequently, tubular casing 31 between the lateral guides just described above but which are not illustrated. Thus, there is a functional advantage which a single tip, or some other form of leader, cannot perform as well. This advantage might seem somewhat modest; however, when it is understood that the tubular casing 31 must be inserted into the high speed automated food stuffing equipment very rapidly, (fractions of a second) and precisely at the tail end of the previous tubular casing, to enable the machine to change over from one casing to another as rapidly as possible, it will be understood that care and patience are not concepts which can be applied to the situation. Therefore, readily self-aligning lead end piece 11 provides a significant advantage and facility in rapidly and precisely feeding a new roll of tubular casing 31 into the automated food stuffing equipment.

As mentioned before, the arrangement of side edges 13 and 15 provide great facility in transforming otherwise flat lead end piece 11 into a tubular section simply by grasping side edges 13 and 15, respectively, between the thumb and index finger and squeezing. This, of course, forces side edges 13 and 15, and lead tips 17 and 19, respectively, towards each other, causing the opposite flat surfaces of lead end piece 11 to bow outwardly in opposed directions, thus forming a tubular section. If additional scoring lines are used, for example fold lines 43B and 43C, other than cylindrical tubular cross-sections can be thus formed. The formation of lead end piece !1 into a tubular section also forms tubular section 35 of tubular casing 31. Lead tips 17 and 19 again provide facility in readily guiding lead end piece 11 and, consequently, tubular casing 31 over, for example, a food stuffing horn 25 as indicated in FIG. 1. Because of the dual-tipped design of lead tip 17 and 19, alignment of the tubular section, which has been formed of lead end piece 11, with, for example, stuffing horn 25, is greatly facilitated.

Figure 6:
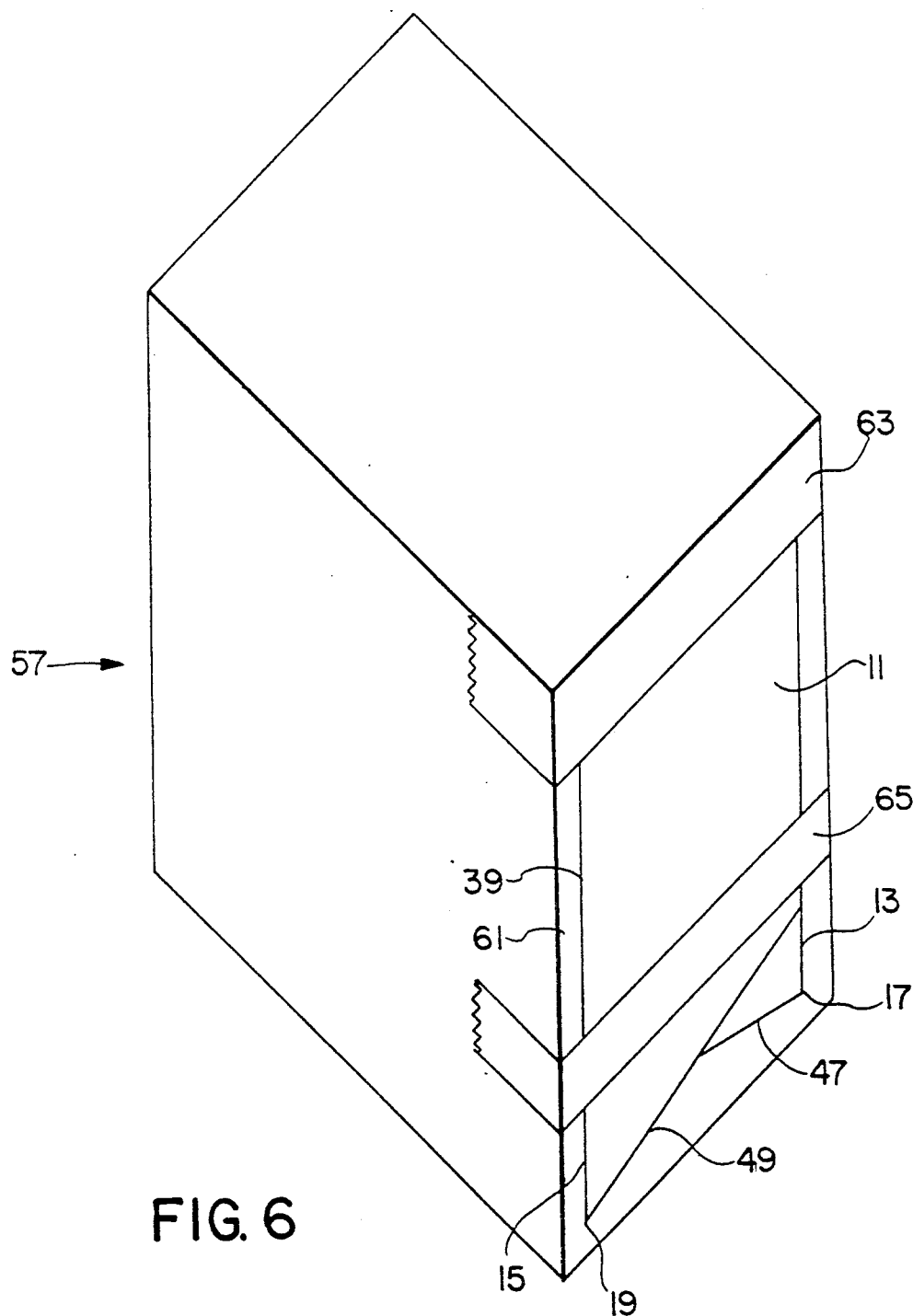
FIG. 6 is the preferred shipping container containing the tubular flattened casing with the preferred lead end piece attached thereto.
Figure 7:
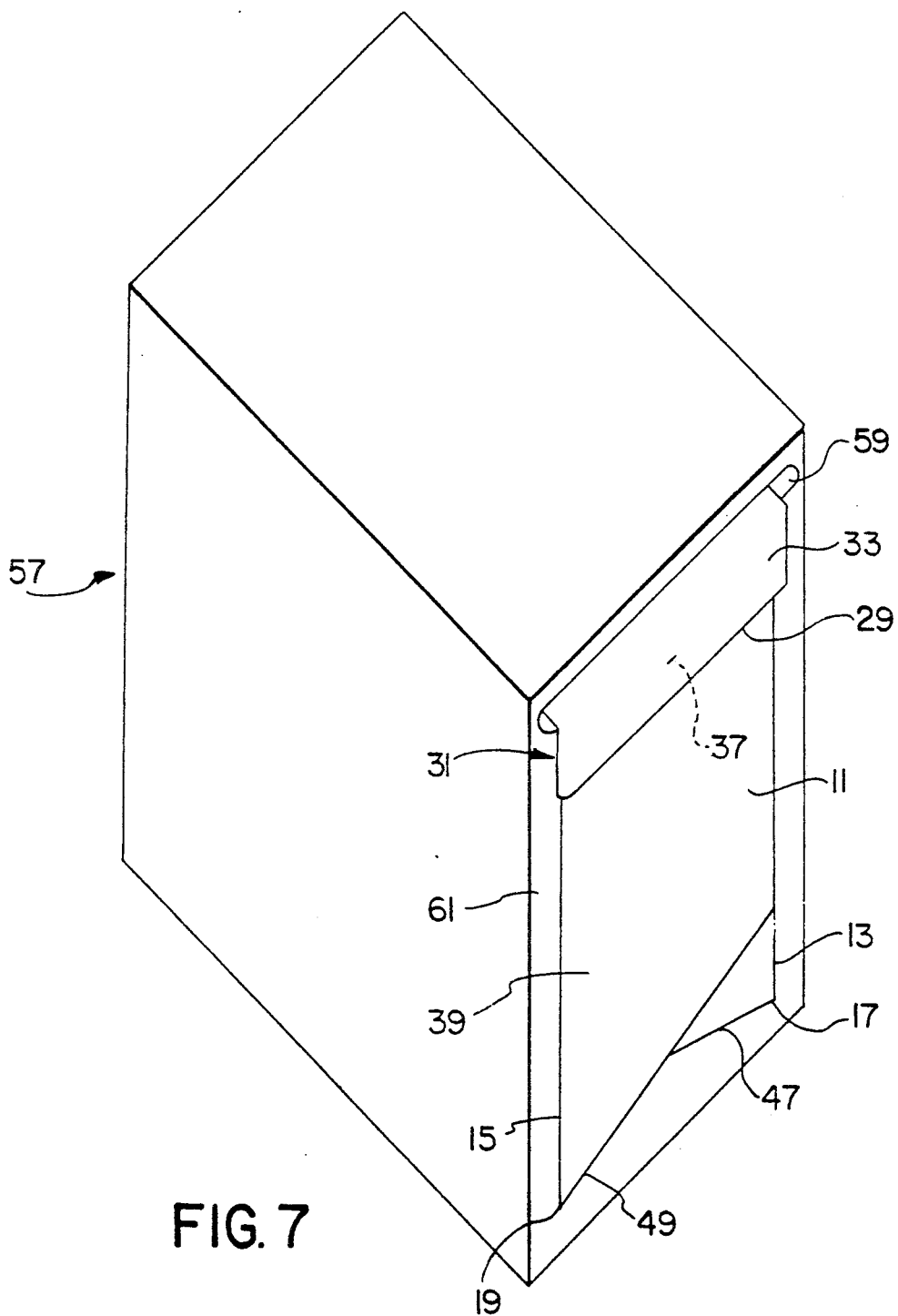
FIG. 7 is the same view as shown in FIG. 6 with the package prepared for introduction of the lead end piece into the guide/roller mechanism of automated stuffing equipment.

Referring to FIGS. 6 and 7, there is shown a shipping carton 57 which is conventional except in one notable respect; slot 59 is inserted in shipping carton 57 to be aligned transversally with the longitudinal extension of tubular casing 31 which, in past designs, would have been packaged inside of carton 57. Otherwise, the location of slot 59 is conveniently placed at about where leading end 29 of tubular casing 31 would, in past designs, otherwise have been disposed within carton 57 upon the packaging thereof. Slot 59 is, in length, preferably slightly wider than flat section 33 of tubular casing 31 to enable flat section 33 to readily pass through slot 59. As shown in FIG. 7, as flat section 33 passes through slot 59, it is bent about 90 degrees downwardly to be folded along carton face 61 of carton 57. Of course, the extension of tubular casing 31 (and flat section 33) is lead end piece 11 which is attached to tubular casing 31 at joint 37. Lead end piece 11 as shown in FIGS. 6 and 7 is likewise positioned flat against face 61 of carton 57.

As shown in FIG. 6, upper tape piece 63 is attached transversally across carton face 61 such that it covers the extension of flat section 33 of tubular casing 31 as well as the location or area of joint 37 where trailing end 27 is attached to leading end 29 of tubular casing 31. Also covered by upper tape piece 63 is the totality of slot 59 with tubular casing 31 extending therethrough. Upper tape piece 63 may extend around the edges of carton face 61 onto adjoining faces of carton 57 if desired. Upper tape piece 63 is readily removable by hand peeling, as it preferably employs a non-hardening adhesive material for contact attachment to carton 57.

Lower tape piece 65 is likewise transversally mounted across the carton face 61 of carton 57, its purpose being to maintain the extension of lead end piece 11, which is positioned flat against carton face 61, in general, in full contact and fully flat against carton face 61. Lower tape piece 65, like upper tape piece 63, is readily removable by hand peeling. Thus, to utilize carton 57, which is loaded with tubular casing 31, upper tape piece 63 and lower tape piece 65 are hand-peeled readily from their respective transverse positions across carton face 61, and lead end piece 11 is grabbed by hand and inserted into guide/roller means, as explained above.

As mentioned previously, the mode of packaging tubular casing 31 into carton 57 may, for example, be by a roll, on the one hand, or a folded, squared quantity on the other hand. Preferably, in the present invention, the folded style is utilized due to the ease of extracting the full length of tubular casing 31 from the carton without removing the packed tubular casing 31 from that carton. On the other hand, rolled material, in boxed form, may readily be incorporated into the packaging system of the present invention. The only critical factor in respect to packaging is that the leading end 29 of tubular casing 31 be extended through slot 59, as previously explained. This avoids the problem of having to open up carton 57 to extract that leading end 29. Thus the extension of leading end 29 of tubular casing 31 through slot 59, and the attachment of lead end piece 11 to tubular casing 31, enables very facile removal of all of tubular casing 31 from carton 57 without ever having to open carton 57.

The foregoing detailed description is a explanation of the preferred embodiment of the present invention, as well as the best mode presently known to the inventors. However, the scope of the present invention is not to be limited by the description of the preferred embodiment but rather is defined by the scope of the claims, following, which are appended hereto and made part of this specification.

What is claimed is:

1. A food emulsion casing packaging system comprising:
   a) means for extracting food emulsion casing, packaged in a flattened, non-shirred form, from a container without substantially opening said container;
   b) deformable leader means, separate from but attached to the lead end of said food emulsion casing, in the form of an extension of said food casing and adapted to be detachably mounted to the exterior of said container such that detachment of said leader means enables extraction of said food emulsion casing from said container without said container being substantially opened; and c) a pair of lead tip extensions, fixed to that end of said leader means which is opposite the attachment of said leader means to the lead end of said food emulsion casing, said lead tip extensions which are adapted to be inserted into and through guide/roller means of automated food emulsion packing equipment, said lead tip extensions which are also adapted to facilitate deformation of said leader means from a flattened shape to a tubular shape, and said lead tip extensions which are also adapted to facilitate alignment of said food emulsion casing with that means of said automated food emulsion packing equipment which fills said food emulsion casing with food emulsion.

2. The invention of claim 1 wherein said means for extracting comprises slot means in said container.

3. The invention of claim 2 wherein said slot means are positioned in the wall of said container adjacent to the position of said lead end of said food emulsion casing as it is packaged in said container.

4. The invention of claim 3 wherein said lead end of said food emulsion casing extends through said slot means.

5. The invention of claim 1 wherein said lead end of said food emulsion casing and said leader means are detachably taped to the exterior wall of said container.

6. The invention of claim 1 wherein said lead end of said food emulsion casing is detachably mounted to the exterior wall of said container.

7. The invention of claim 1 wherein said leader means is detachably mounted to the exterior wall of said container.

8. The invention of claim 1 wherein said leader means comprises a flattened tubular section of a material which is greater in stiffness, than the stiffness of said food emulsion casing, but is also flexible and resilient to a degree sufficient to enable said deformability.

9. The invention of claim 1 wherein said leader means comprises a flattened tubular section formed from folding a single sheet of material such that previously opposed edges of said material form a juncture, said juncture which comprises the attachment of said opposed edges to each other.

10. The invention of claim 9 wherein said attachment of said opposed edges to form said juncture is effected by the application of adhesive means thereto.

11. The invention of claim 10 wherein said adhesive means comprises pressure sensitive tape.

12. The invention of claim 10 wherein said adhesive means comprises glue.

13. The invention of claim 1 wherein said lead tip extensions comprise portions of opposed edges of said leader means.

14. The invention of claim 9 wherein said lead tip extensions comprise portions of opposed edges of said leader means, said juncture being one of said opposed edges and the fold resulting from said folding of said single sheet of material being the other of said opposed edges.

15. The invention of claim 14 wherein a leg of each of said lead tip extensions comprises a diagonal cut fully across a flattened face of said flattened tubular section.

16. The invention of claim 14 wherein a leg of each of said lead tip extensions comprises two matched diagonal cuts one-half way across a flattened face of said flattened tubular section.

* * * * *